(12) United States Patent
Gray et al.

(10) Patent No.: US 7,380,832 B2
(45) Date of Patent: Jun. 3, 2008

(54) PRETENSIONER WITH INTEGRATED GAS GENERATOR

(75) Inventors: Mark F. Gray, Sterling Heights, MI (US); Chris D. Hall, Clay Township, MI (US)

(73) Assignee: Takata Seat Belts, Inc., Aubrun, MI (US)

( * ) Notice: Subject to any disclaimer, the term of this patent is extended or adjusted under 35 U.S.C. 154(b) by 201 days.

(21) Appl. No.: 11/099,429

(22) Filed: Apr. 5, 2005

(65) Prior Publication Data

US 2006/0220369 A1    Oct. 5, 2006

(51) Int. Cl.
B60R 22/36    (2006.01)
F02N 13/00    (2006.01)

(52) U.S. Cl. ............................ 280/806; 60/632; 60/635

(58) Field of Classification Search ................ 280/806, 280/807; 297/480, 497; 180/268, 270; 60/632, 635, 636, 637, 638
See application file for complete search history.

(56) References Cited

U.S. PATENT DOCUMENTS

| | | | |
|---|---|---|---|
| 2,845,234 A * | 7/1958 | Cushman et al. ............ 242/379 |
| 2,945,563 A | 7/1960 | O'Hara |
| 3,776,586 A | 12/1973 | Ahlgren et al. |
| 4,008,780 A | 2/1977 | Bendler et al. |
| 4,152,025 A * | 5/1979 | Bendler et al. ............. 297/470 |
| 4,572,565 A | 2/1986 | Epstein |
| 4,641,816 A | 2/1987 | Kishida et al. |
| 5,037,134 A | 8/1991 | Tabata |
| 5,039,127 A * | 8/1991 | Fohl ............................ 280/806 |
| 5,211,423 A * | 5/1993 | Krambeck ................... 280/806 |
| 5,443,222 A | 8/1995 | Mödinger et al. |
| 5,519,997 A * | 5/1996 | Specht ......................... 60/632 |
| 5,553,890 A | 9/1996 | Bühr et al. |
| 5,564,748 A * | 10/1996 | Kmiec et al. ................ 280/806 |
| 5,582,447 A | 12/1996 | Leon et al. |
| 5,588,677 A | 12/1996 | Kopetzky et al. |
| 5,624,083 A | 4/1997 | Mödinger et al. |
| 5,634,690 A * | 6/1997 | Watanabe et al. ........... 297/480 |
| 5,641,131 A | 6/1997 | Schmid et al. |

(Continued)

FOREIGN PATENT DOCUMENTS

DE    32 31 509 A1    3/1984

(Continued)

*Primary Examiner*—Ruth Ilan
*Assistant Examiner*—Joseph Rocca
(74) *Attorney, Agent, or Firm*—Fitch, Even, Tabin & Flannery

(57) ABSTRACT

A low cost pretensioner is provided by using an ignitable charge and initiator integrated with a piston which is disposed in a cylindrical metal tube that has a common straight gas generation and piston travel bore so that a inexpensive metal tube rather than a complex casting can be used. A cable is connected at one end to the piston and passes through a cable deflection device having a locking device for locking the cable against travel in a reverse direction after tightening the seat belt system. The locking device may be an inexpensive, one-piece wedge-shaped clamping or gripping device which transfers the high tensile forces from the passenger's body pulling on the cable through the deflection device to a vehicle anchorage rather than through a locking device which is disposed within the cylinder tube which must have tube walls sufficiently strong to withstand such high tensile forces.

9 Claims, 4 Drawing Sheets

U.S. PATENT DOCUMENTS

| | | | |
|---|---|---|---|
| 5,651,564 A * | 7/1997 | Isaji et al. | 280/806 |
| 5,676,397 A * | 10/1997 | Bauer | 280/806 |
| 5,782,492 A * | 7/1998 | Ojima et al. | 280/806 |
| 5,788,025 A * | 8/1998 | Nishide et al. | 188/82.7 |
| 5,842,344 A | 12/1998 | Schmid | |
| 5,897,140 A | 4/1999 | Weir | |
| 5,911,440 A * | 6/1999 | Ruddick et al. | 280/806 |
| 5,944,350 A | 8/1999 | Grabowski et al. | |
| 6,095,615 A * | 8/2000 | Wier | 297/480 |
| 6,131,951 A * | 10/2000 | Chicken et al. | 280/806 |
| 6,186,549 B1 | 2/2001 | Specht et al. | |
| 6,213,513 B1 | 4/2001 | Grabowski et al. | |
| 6,227,478 B1 | 5/2001 | Hudelmaier et al. | |
| 6,237,958 B1 | 5/2001 | Patrickson | |
| 6,264,281 B1 | 7/2001 | Dukatz et al. | |
| 6,325,416 B1 | 12/2001 | Wier | |
| 6,341,562 B1 | 1/2002 | Brisighella | |
| 6,454,306 B1 * | 9/2002 | Cunningham et al. | 280/806 |
| 6,726,250 B2 | 4/2004 | Ennerdal | |
| 2002/0088890 A1 | 7/2002 | Shih et al. | |
| 2003/0011186 A1 | 1/2003 | Schwald | |
| 2003/0030263 A1 | 2/2003 | Nakano et al. | |
| 2003/0090101 A1 | 5/2003 | Ennerdal | |
| 2004/0094946 A1 | 5/2004 | Prentkowski | |
| 2004/0150210 A1 * | 8/2004 | Cunningham et al. | 280/806 |

FOREIGN PATENT DOCUMENTS

| | | | |
|---|---|---|---|
| DE | 42 30 663 A1 | 3/1994 | |
| DE | 199 41 435 A1 | 4/2001 | |
| EP | 0 629 531 B1 | 4/1997 | |
| EP | 1 074 438 A2 | 2/2001 | |
| GB | 2 250 419 A | 6/1992 | |
| GB | 2 281 189 A | 3/1995 | |
| GB | 2 375 329 A | 11/2002 | |
| GB | 2 389 344 A | 12/2003 | |
| GB | 2 389 345 A | 12/2003 | |
| JP | 3-292239 | * 12/1991 | 280/806 |
| WO | WO 03/104050 | 12/2003 | |
| WO | WO 04/000612 | 12/2003 | |
| WO | WO 2004/002785 | 1/2004 | |

* cited by examiner

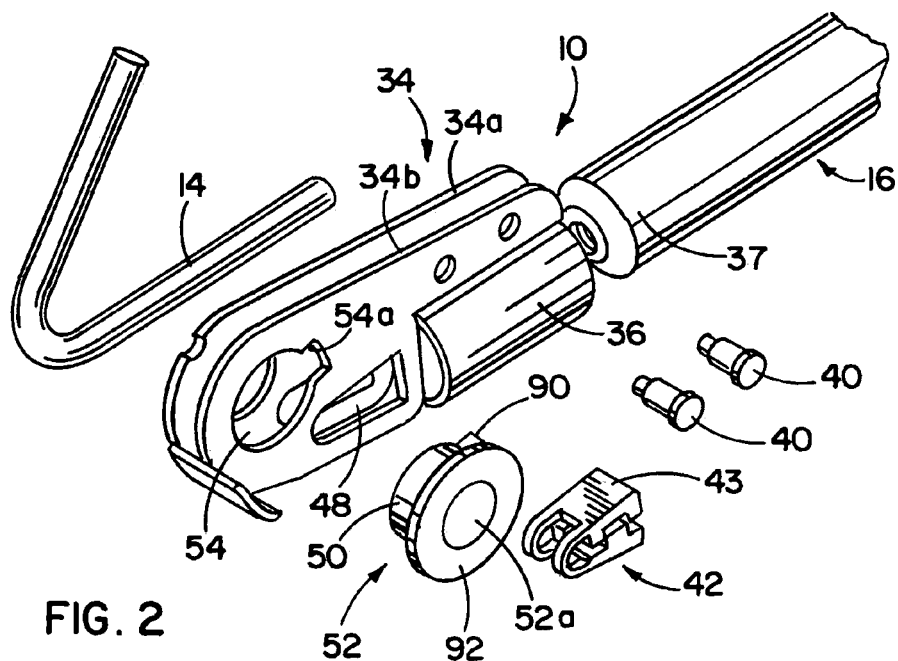
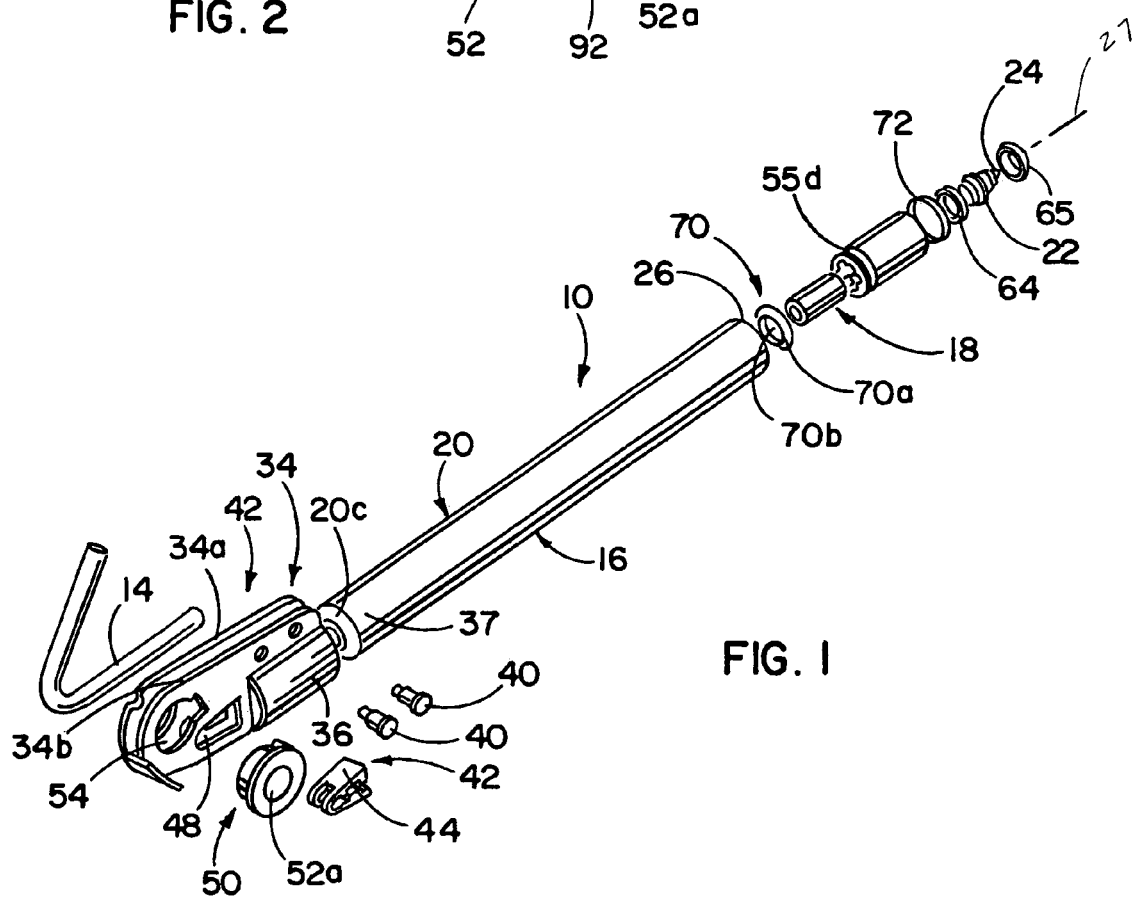

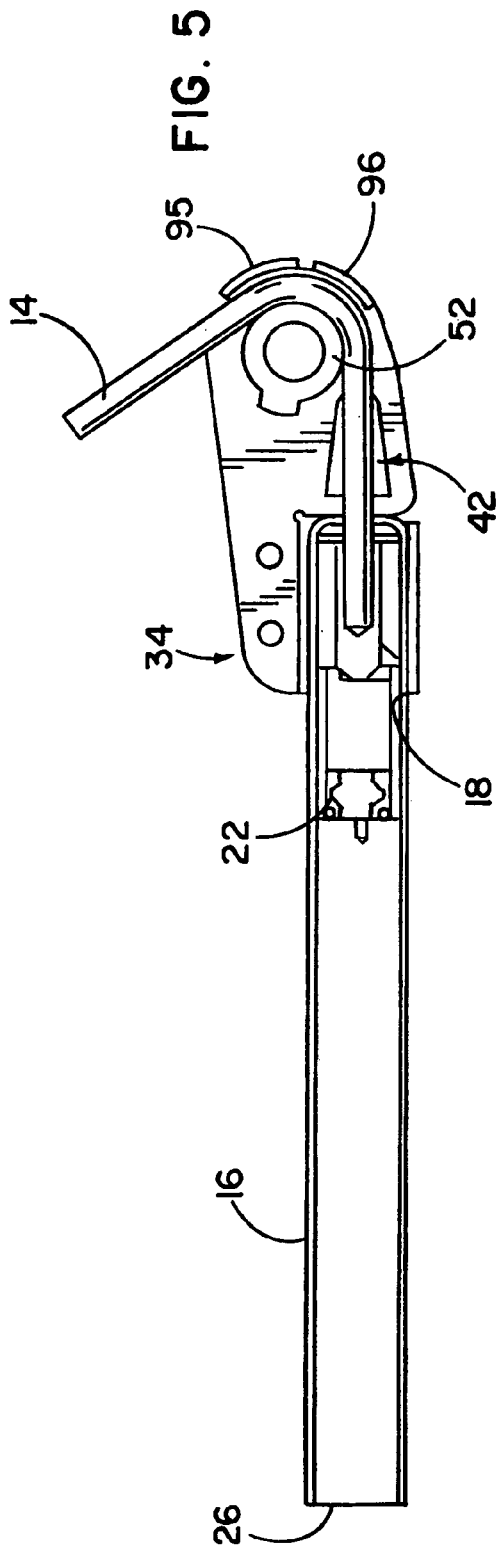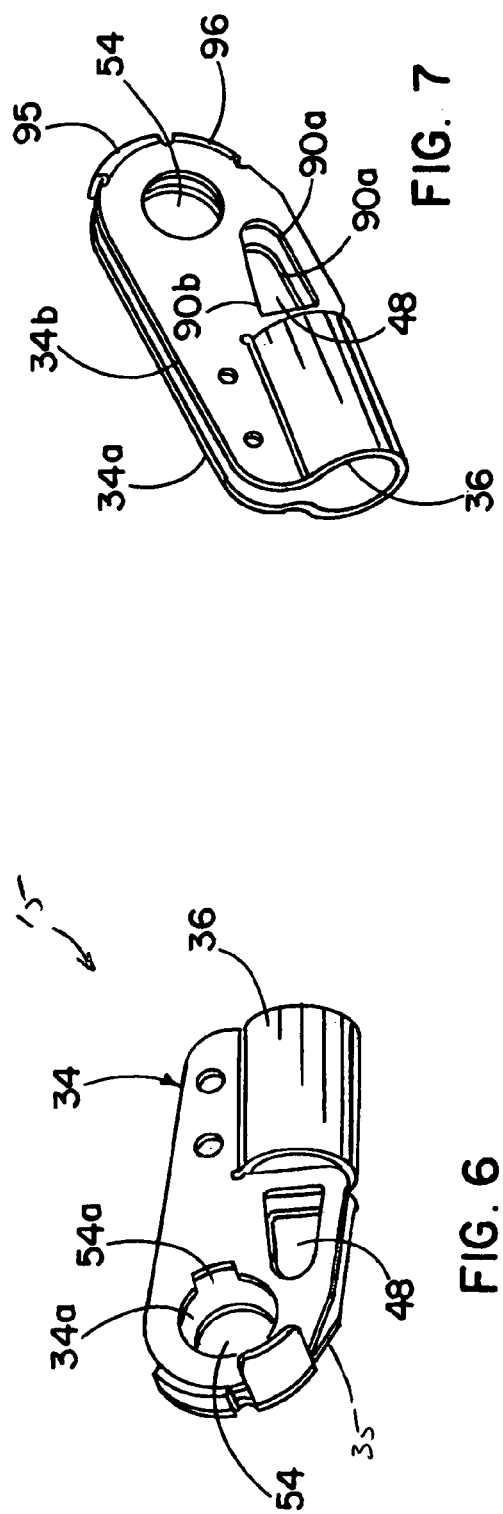

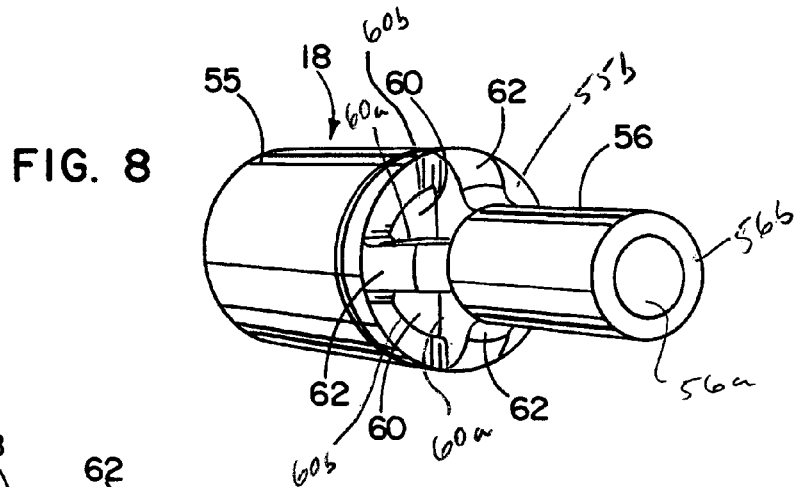
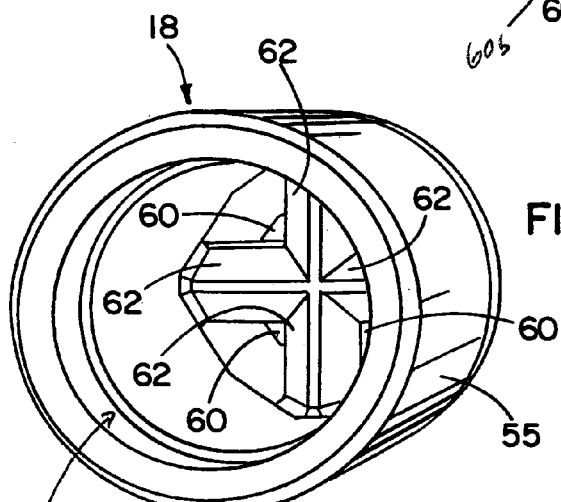
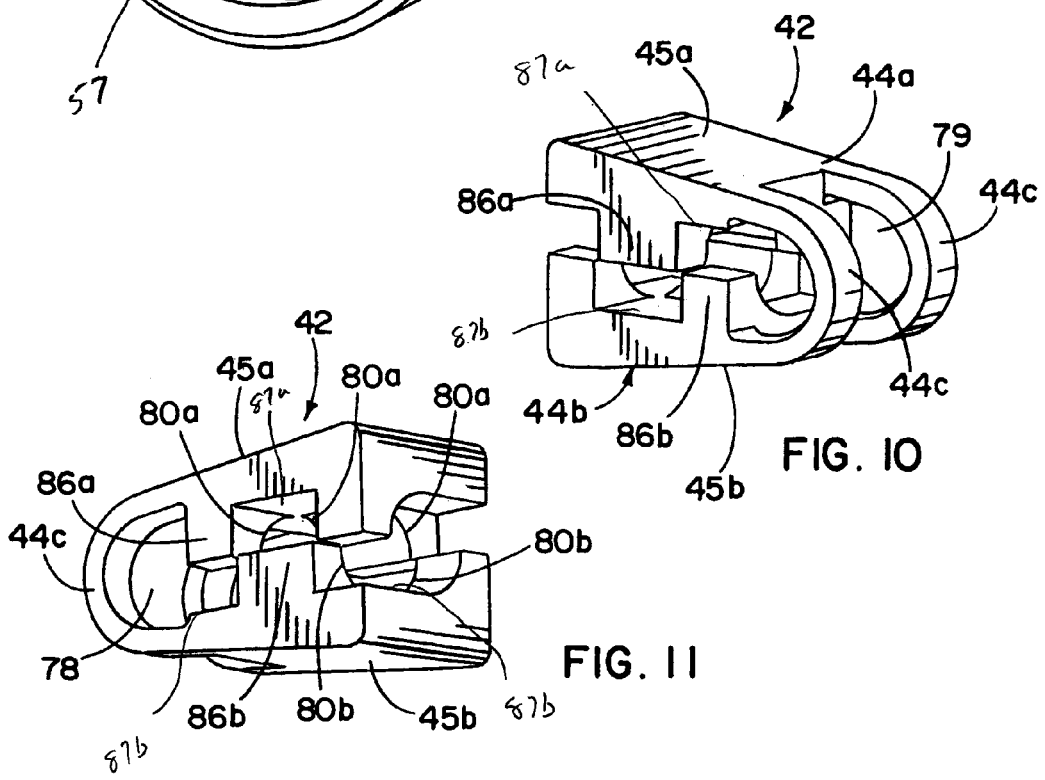
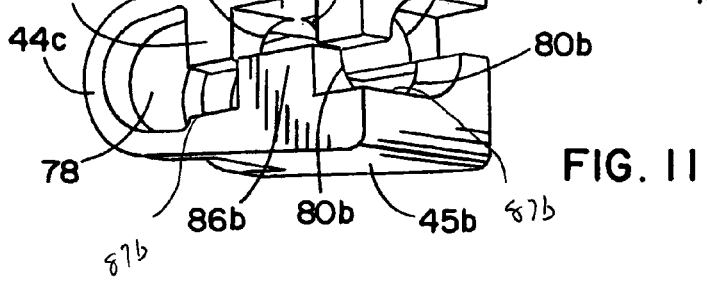

PRETENSIONER WITH INTEGRATED GAS GENERATOR

FIELD OF THE INVENTION

This invention relates to a pretensioner for an occupant restraint system securable to a vehicle chassis and more particularly to a safety belt occupant restraint system with the pretensioner having a power operated device for drawing a connecting member to remove slack from the seat belt system.

BACKGROUND OF THE INVENTION

Pretensioners are known which use a power operated device having a piston which is mounted within a cylinder and is driven by an ignitable charge to travel in a first direction and to pull a connecting member which is usually an attached, flexible member such as a cable to remove safety belt slack in the occupant restraint system. More specifically, the slack is removed by the cable, which is usually attached to a buckle part of a three-point buckle system in a downward direction to tighten the safety belt about the passenger. The power operated device includes a pyrotechnic gas generator which drives a piston attached to the cable forwardly to travel the necessary distance to remove the slack from the seat belt system. The pretensioner includes a cable deflection device which changes the direction of cable travel from a generally vertical direction at the buckle to a generally horizontal direction of travel for the cable end attached to the piston traveling in a horizontally disposed cylinder. When the piston has traveled to the full extent of its travel and has taken out the slack, the pretensioner will have pulled the person down on the seat and thereafter the person and the attached belt system begin to rebound upwardly.

To prevent the passenger from rebounding and returning slack into the seat belt system, a one-way locking mechanism is provided to resist the opposite direction rebound travel of the cable such as disclosed in U.S. Pat. No. 6,213,513. As shown in this patent, the gas generator and the deflection device of the pretensioner include metal castings of complex shapes which add considerably to the cost of the pretensioner device and it is desired to eliminate the casting to reduce the cost of pretensioners. A pretensioner constructed without such a complex casting is disclosed in U.S. Patent Application Publication No. 2003/0030263; but in this pretensioner a tubular cylinder member has a piston with a locking device in the cylinder and an integral end portion of the cylinder bent at an acute angle and sized and shaped to hold a gas generator therein. Moreover, in most of these pretensioners the one-way clutch or one-way locking device for the cable is provided within the cylinder and is positioned on the piston and is cooperable with the cylinder wall. The cylinder must be made strong enough to transfer these forces from the piston and cable during the passenger's rebound pulling on the cable through the locking device and the cylinder to the pretensioner's anchorage on the vehicle. These cylinders usually have grooves serrations, or the like on their interior walls that cooperate with balls or other one-way locking components on the piston.

There is a need to simplify the pretensioner construction in order to reduce its cost and there is also a need to provide a simplified seat belt pretensioner in both the number of components and their assembly. Usually, these seat belt pretensioners are relatively large and costly, hence, there is a need to provide a slim profile and low cost pretensioner that provides not only a cost advantage but also provides a packaging advantage. There is simply not much space about the seats of a vehicle of various kinds to install a pretensioner and to attach it to the vehicle floor or to the seat. Thus, a slim profile for the pretensioner is desirable. Different vehicle specifications and/or different OEMS will require various sizes of charges and gas generation forces and it is desirable to be able to have a pretensioner that can provide such variable charges in an easy manner.

SUMMARY OF THE INVENTION

In accordance with the illustrated embodiment, an improved low cost and simplified seat belt pretensioner is achieved by using an inexpensive cylindrical metal tube with an integrated gas generator disposed in the piston and traveling in the bore of the metal tube rather than by using, as in the prior art, a complex metal casting with an angular gas generation portion thereon for delivering gas to a straight cylinder portion of the complex casting.

In this illustrated embodiment, a simple, low cost pretensioner is achieved by elimination of complex castings used for the gas generation and to use instead an inexpensive cylindrical metal tube having a hollow bore, an integrated piston having an ignitable charge in the piston, and a deflection device for the cable with the cylinder tube being mounted directly to the cable deflection device. In this embodiment a simple locking device for locking the cable against travel in the rearward direction during rebound travel of the seat belt and passenger is mounted in the cable deflection device, and thus is located externally of the cylinder rather being within the cylinder. Therefore, the large tensile forces from the cable during rebound may bypass the cylinder and be transferred directly to the cable deflection device and from it to the vehicle. This is in contrast to conventional, integrated gas generators where the locking device is on the traveling piston and the cylinder wall so that the cylinder must be made strong enough to transfer these tension forces to the vehicle floor or seat anchorage of the pretensioner.

The preferred locking device comprises a wedge mounted in the cable deflection device and further comprising a first wedge-shaped portion on one side of the cable and a second wedge portion on an opposite side of the cable to lock the cable against rebound movement. In the illustrated embodiment, the wedge is an integral one-piece wedge having the first and second wedge-shaped portions integrally joined together to form a one-piece wedge that is mounted in a recess or an opening in the cable deflection device.

To simplify the number of components, to reduce the cost and to provide a low profile for the illustrated pretensioner, it is provided with an integrated piston having an electrical ignitable charge disposed in a recess at one end of the piston with an adjacent igniter which is also disposed in the piston recess. The igniter and ignitable charge are held in the position in a recess in the piston by crimping down an end of the piston wall at the end of the recess to retain the same without the use of a separate threaded retainer or other complicated retainers for each of the propellant charge and the initiator, thereby simplifying the construction of the integrated gas generator and piston. In this preferred integrated gas generator and piston, the ignitable charge may be mounted in a bag such as a mylar bag containing an ignitable powder disposed within the bag. The amount of powder in the bag may be easily varied due to the flexibility of the bag to meet the specifications of vehicle manufacturers for their various vehicles or to meet the government standards.

BRIEF DESCRIPTION OF THE DRAWINGS

The illustrated embodiment will now be described in the following by way of example and with reference to the drawings wherein:

FIG. 1 is an exploded view of a pretensioner embodying the preferred embodiment;

FIG. 2 is an enlarged exploded view of the pretensioner shown in FIG. 1;

FIG. 5 is a broken away view showing a cable mounted in the deflection device and connected to the piston disposed within the cylinder in which the piston slides;

FIG. 6 is a perspective view of a folded metal deflection device used in the embodiment of FIG. 1;

FIG. 7 is another perspective view of the deflection device shown in FIG. 6;

FIG. 8 is an enlarged perspective view of the preferred piston used for the gas generator;

FIG. 9 is a rear perspective of the piston shown in FIG. 8;

FIG. 10 is a perspective view of the wedge used in the deflection device to grip the cable to limit cable movement in the opposite direction; and FIG. 11 is another perspective view of the one-piece wedge shown in FIG. 10.

DETAILED DESCRIPTION OF THE PREFERRED EMBODIMENT

Figure 3:
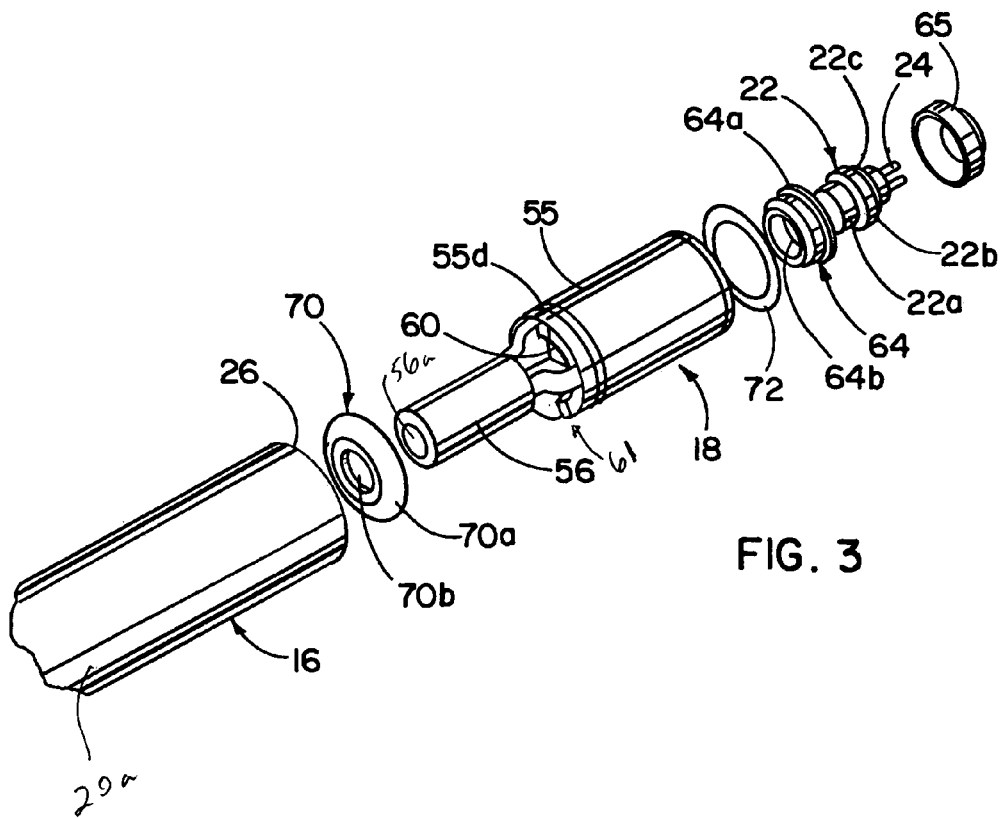
FIG. 3 is an exploded view of the integrated gas generator and piston having an ignitable charge therein.

As shown in the drawings for purposes of illustration, the illustrated embodiment comprises a pretensioner 10 having a flexible member, such as a cable 14, which is connected to an occupant restraint belt system, usually a three point belt system and usually connected to the buckle part of the occupant restraint system. The pretensioner comprises an integrated gas cylinder unit 16 having a piston 18 mounted within a cylinder 20 for travel upon ignition of a charge 21 (FIG. 4) to generate gas within a chamber in the cylinder to cause the piston to travel, to pull the cable 14, to tighten the belt in the occupant restraint system about the passenger. This pyrotechnical gas generator in this instance includes the charge 21 and an igniter 22 which has extending therefrom electrical leads 24 extending through an open forward end 26 of the cylinder for connection to a sensor which causes a triggering of the charge located in the pyrotechnical gas generating device. Upon ignition, the high pressure gas abruptly builds up in the cylinder chamber which displaces the piston to the right as viewed in FIG. 1.

One end of the cable 14 is fixedly connected to the piston 18 at the center of the piston. This cable end is inserted into an opening in the piston and a surrounding wall of the piston is crimped or otherwise secured to the cable end to the piston.

In accordance with the illustrated embodiment, a low cost and simplified pretensioner is achieved by using an inexpensive cylindrical metal tube to provide a gas generating and confining chamber for an integrated gas generator which includes the gas generating charge 21 in the piston 18 which travels within the cylindrical tube bore thereby resulting in a very simple, low cost pretensioner without the use of any expensive castings for the gas generating portion of the pretensioner. The complex castings in the gas generator generating portion heretofore used have added considerably to the cost. Typically these prior art gas generating portions have a separate gas generator charge and igniter located at an angle to the axis of a cylindrical bore in which the piston travels. That is, the gas generated is delivered and flows at an angle into the cylindrical bore.

Another feature adding to this simplified, low cost pretensioner is the use of an inexpensive and simple, one-way locking device 42 in the cable deflection device rather than in the cylinder and/or on the piston, as is common in the prior art pretensioners. The heavy loading on the cable being locked may be transmitted from the locking device through a cable deflection device 15 to the anchorage rather than through the cylinder. The cable deflecting device may take various forms one of which is a casting and the other of which is the folded sheet metal, cable deflection device. As best seen in FIGS. 2 and 6, the illustrated cable deflection device comprises a sheet metal folded body 35 having a pair of spaced, main wall portions 34a and 34b which are integral to one another and have a forward connecting portion 36, preferably in the form of a clamping portion to clamp the adjacent end 37 of the cylinder. More specifically, the end of the connecting portion 36 is provided with a curved, substantially cylindrical wall matching the curvature of the cylindrical end 37 of the cylinder. The curved connecting portion on the pretensioner body is preferably clamped about the cylinder end 37 by fasteners, such as in the form of a pair of rivets 40 as shown in FIG. 2 which reduces the spacing between the upper ends of the side walls 34a and 34b.

In accordance with another important aspect of the pretensioner 10, the locking device comprises a wedge 43 which is disposed in the deflection device 34 to lock the cable so that the tension on the cable being exerted during rebound of the occupant which causes a pull force to be exerted on the piston to travel in the reverse direction, which would allow slack to return within the elongated cable, is substantially prevented. This cable locking wedge 43 preferably is formed very inexpensively by being a one-piece form of wedge, in this illustrated embodiment, which is received within corresponding, laterally aligned recesses 48 in each of the respective upstanding walls 34a and 34b of the folded metal body. The cable slides substantially freely through the cable locking or gripping device when the piston is being driven by the expanding gas. However, during rebound of the occupant and a pulling of the cable in the opposite direction, the one-piece wedge is driven rearwardly along the wedge-shaped side walls of the folded metal body 35 to grip and clamp the cable; and, these high loading forces from the cable are transferred through the wedge 43 to the deflection body 35 and then to the vehicle. Thus, the transfer of the forces through the cable deflection device to the vehicle avoids an expensive gripping device mounted in the cylinder or on the piston as in the prior art. Because the forces from the cable during rebound are very high, prior pistons and cylinders had to be strong to withstand the forces. This stronger, heavier cylinder is, of course, more expensive than the tubular cylinder which can be relatively thin-walled to contain the gas pressures and to guide the piston in its travel. By way of example and not limitation, the cylinder 20 can have a wall thickness on the order of 0.04 inch.

Figure 4:
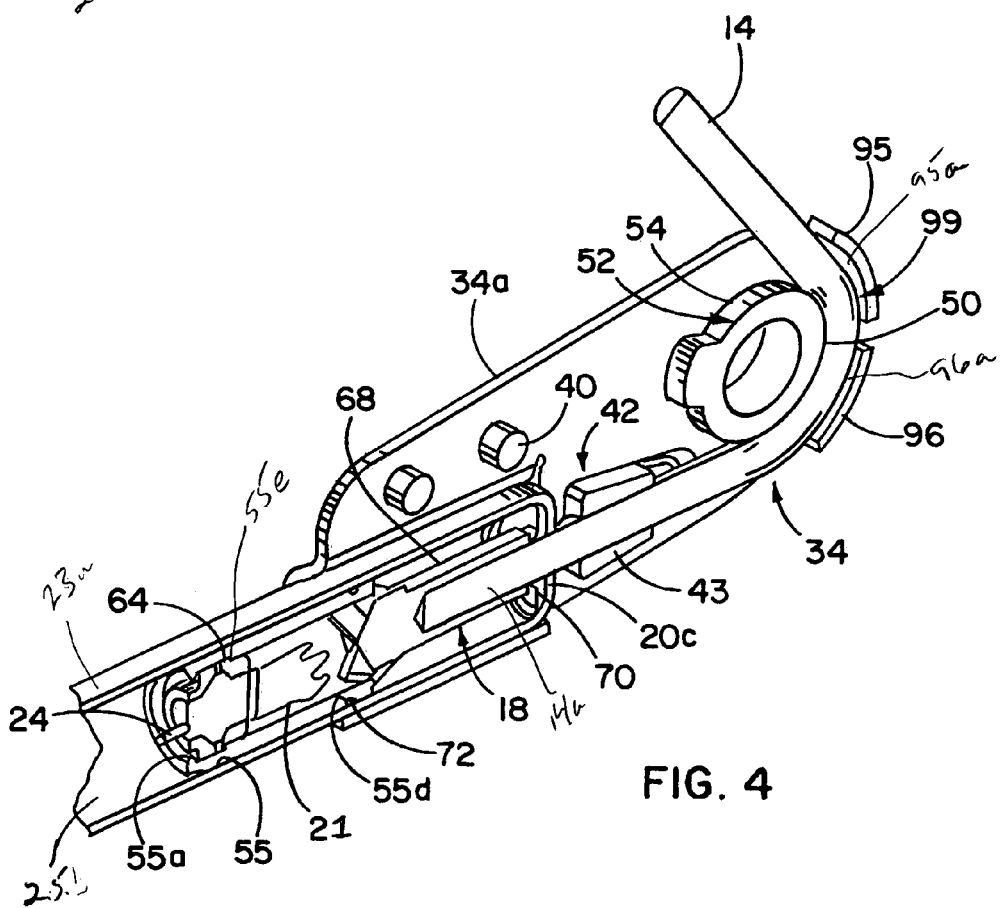
FIG. 4 is an enlarged, cross-sectional view of the deflection device and integrated gas generator and cylinder.

The deflection device 15 has a curved surface 50 about which the cable travels as best seen in FIGS. 2 and 4 with the cable having an arcuate path engagement with the curved surface 50 which, in this instance, is on an insert 52 which is shaped like a pulley. The pulley-shaped insert 52 is positioned within corresponding, laterally aligned recesses 54 in each of the side walls 34*a* and 34*b* of the folded metal body of the deflection device.

In accordance with an important aspect of the illustrated embodiment, a low cost piston gas generator, which is integrated with a charge 21 and the igniter 22, as best seen in FIG. 4, is positioned, held and located in the open recess 57 of a large diameter end portion 55 of the piston 18 by an inexpensive crimping or deflecting of the piston wall to a smaller diameter to prevent the reverse travel of the igniter from the piston during gas generation. During gas generation, the gas generated within the large diameter portion 55 (FIG. 3) is discharged through gas ducts or openings 60 (FIGS. 8 and 9) formed between four rib-like portions 62 in a transition wall 61 between the large piston portion and a smaller cylindrical portion 56 of the piston. In the preferred embodiment the gas generating charge 21 is first inserted and positioned in the piston recess or bore 57 and then a ring-like retainer or adapter 64 (FIGS. 1 and 4) is positioned within the cylinder to bring an annular shoulder thereon against an annular shoulder wall 55*e* in the internal recess 57 of the piston. The retainer 64 has an internal bore 64*b* which is sized to receive a cylindrical head portion 22*a* of the igniter 22 with a shoulder wall 22*b* of the igniter positioned against the retainer 64*a* to prevent displacement of the igniter in the direction towards the charge 21 located in the piston. On the outer side of the initiator is another ring adapter 65 which has an internal bore sized to receive and position the rear cylindrical portion of the initiator. The outer diameter of the ring 65 is sized to be engaged by the crimped down end of the piston after the charge and initiator are positioned in the piston. The size and shape of these ring-like adapters 64 and 65 may be changed to allow different sizes and/or shapes of initiators to be used in the piston. Thus, by changing the amount of charge in the mylar bag, as readily accommodated by the flexible nature of the bag material, and/or changing to another commercially available initiator, which is positioned by appropriately configured ring adapters 64 and 65, this pretensioner may be readily changed to meet different vehicle specifications. To this end, the large size of the elongate, large diameter piston portion 55 relative to the cylinder 20 also provides for flexibility in the volume of the charge 21 that can be held therein. The long length of the large diameter piston portion 55 also assists in keeping the piston 18 aligned in the cylinder 20 and as it travels axially forward after ignition of the charge 21.

As stated above, the crimped end 55*a* of the piston wall 55 is preferably thinner and of a smaller diameter in order to facilitate the crimping downwardly to a smaller diameter to abut the outer shoulder 22*c* on the igniter 22 thereby retaining the igniter, the washer and the charge against being blown from the piston when the charge 21, e.g., nitrocellulose smokeless powder, is ignited and the gas is generated to flow from the ducts 60 and across the small diameter portion 56 of the piston and into the annular space or cylindrical chamber 68 between smaller diameter piston portion 56 and the spaced wall of the cylinder. The assembly of the mylar bag charge 21 and the igniter 22 by crimping of the end of the piston wall provides an easy assembly and retention of the igniter and charge in the piston at a low assembly cost and reduces the number of components used for this retention.

To seal the internal chamber 68 during gas generation and to limit the leakage of gas therefrom as would reduce the gas pressure used to drive the piston 18, there is provided the usual cable seal 70 which comprises a body 70*a* of elastomeric material or the like having an internal bore 70*b* at the center of the body 70*a*. The center bore 70*b* is sized to the cable diameter with a friction fit and this is positioned against a curved end wall 20*c* at the rear end of the cylinder body 20. The end wall 20*c* has a coaxially located opening through which the cable passes from the deflection device to its end which is secured to the head of the piston.

Referring to the illustrated piston 18 as best seen in FIG. 3, the outer surface 23 of the cylindrical wall 20*a* of the piston can be provided with a groove 55*d* which is annular in shape and receives an annular seal ring 72 which is positioned over the cylindrical wall 55 and seated in the groove 55*d*. The seal ring 72 also engages the encircling, inner wall surface 25 of the cylinder 20 and slides therealong thereby sealing the gas generating chamber 68 from a large escape of the generating gas flowing between the sliding piston wall 55 and the adjacent interior cylinder surface 25 of the pretension cylinder 20.

Continuing the description of the illustrated piston 18, as best seen in FIGS. 3, 8 and 9, the transition wall 61 is a generally curved or conical-shaped wall 61 joining the large diameter piston portion 55 and the smaller diameter portion 56 with four relatively large openings or ducts 60 equally spaced about this transition wall to allow the gas generated internally within the bore of the larger diameter portion of the piston to flow in an axial direction from the ducts and to expand against the outer surface of the small diameter portion 56, the inner cylindrical surface 25 of the cylinder, the closed end of the cylinder and against the seal 70 and seal ring 72 which limits the escape of gas. The ducts walls are generally triangular in shape as seen in FIGS. 8 and 9 and the transition wall portions are generally in the form of narrow ribs 62. FIG. 9 affords a rear view through the large diameter recess in the piston for holding the charge and igniter and shows the ducts 60 and the ribs 62 which separate the ducts and provide strength to the transition wall 61.

As can be seen, gas emitted from the large piston bore 57 via ignition of the charge 21 is provided with easy egress from the piston 18 into the chamber 68 formed about the small diameter, elongate rear piston portion 56. The expanding gas does not need to travel through small bores and through gas flow passages oriented obliquely to the cylinder axis 27. Instead, four, relatively large openings 60 are provided which allow for axial flow of the expanding gas out from the piston bore 57.

The cable 14 has its end portion 14*a* inserted in an elongate bore 56*a* formed in the piston small diameter portion 56, shown in FIGS. 3-5 and 8. There is a relatively long length of the piston wall 56*b* encircling the cable end portion 14*a*, and the piston wall 56*b* is crimped tightly down onto the cable portion 14*a*. The length of wall 56*b*, enables the gripping to occur along a long length of the cable 14 so that the cable end portion is securely held by the piston portion 56.

By way of example and not limitation, the diameter of the piston portion 55 can be approximately 19 mm, and the diameter of the piston portion 56 can be approximately 10 mm, with their respective axial lengths being approximately 37 mm and 21 mm. The generally triangular ducts 60 can be formed of a pair of equal length, straight edges 60*a* of approximately 4.7 mm in length extending along the ribs 62 with an arcuate, interconnecting edge 60*b* generally extending between the edges 60*a* formed on the end face 55*b* of the piston portion 55. The arcuate edge 60*b* can have a radius of approximately 7 mm.

In accordance with an important aspect of the pretensioner, the preferred locking device 42 comprises a one-piece wedge body 44 which is formed with an upper wedge portion 44*a* that is adapted to be locked or clamped to the upper side of the cable and is formed with a lower wedge portion 44*b* that is adapted to be clamped to the or locked to the lower side of the cable when the cable attempts to move in the rebound direction. The tensile forces on the cable cause the respective upper, inclined and flat surface 45*a* on the upper portion 44*a* and the lower flat portion 45*b* on the lower portion 44*b* to be moved rearwardly along the narrowing recess walls and to be squeezed toward one another. An integral connection piece or portion 44*c* on the wedge joins the upper wedge portion and the lower wedge portion and is formed in the shape of a pair of curved ribs 76 which are relatively thin members compared to the gripping portions 45*a* and 45*b* because of a large space or recess 78 between these ribs 76. The ribs 76 also have inner surfaces curved about openings 79 between their upper and lower end attachment to the upper wedge portion and lower wedge portions, respectively.

The actual gripping of the cable which is generally in the rounded, cross-section or is cylindrical in shape, is between upper forward and rearward curved surfaces 80*a* on the underside of the upper wedge portion 44*a* and forward and rearward curved surfaces 80*b* on the top side of the lower wedge portion 44*b*. In the illustrated embodiment, each of the wedge portion 44*a* and 44*b* are formed with interlocking projections or teeth 86*a* and 86*b* having the respective curved surfaces 80*a* and 80*b* associated therewith and which project into recesses formed between teeth in the opposite wedge portion. More specifically as best seen in FIGS. 10 and 11, the upper teeth projections 86*a* are spaced from one another by an upper recess 88*a* into which will project the lower tooth 86*b* on the lower wedge member as the top wedge and bottom wedge surfaces 45*a* and 45*b* are cammed toward one another. Flats 87*a* and 87*b* of the wedge portions 44*a* and 44*b* face the teeth of the opposite wedge portion and limit the movement of the wedge portions toward each other when the teeth 86*a* and 86*b* engage the corresponding facing flats 87 and 87*b* and thus also limit the compressive force exerted on the cable via the wedge portions and their curved surfaces 80*a* and 80*b*. In this manner, the wedge 42 firmly locks the cable against rearward travel without causing undue stress on the cable that may lead to breakage thereof.

The wedge-shaped locking device, when positioned in the locking recesses in the spaced walls of the deflection device, has the lower wedge surface 45*b* which is inserted into and positioned against the lower surface 90*a*, as best seen in FIG. 7, and the top surface 45*a* of the upper wedge portion will be positioned against the downwardly, inclined top surface 90*b* of the recesses formed in the metal walls 34*a* and 34*b*. Preferably the wedge is precast so that the differences in the spacing between the curved gripping surfaces 80*a* and 80*b* define a diameter slightly smaller than the outer diameter of the cable so that the wedge-shaped locking device will be biased, i.e., spring loaded to grip the cable with some lesser force than the locking force when the locking wedge is positioned in the deflection device. When the pretensioner is fired, this slight interference fit is readily overcome by the large driving force generated by the ignited charge 21 on the piston 18 and attached cable 14 to pull the cable 14 through the wedge 42 opening so the surfaces 80*a* and 80*b* do not inhibit the pretensioning action generated on the seat belt system. In this regard, with the wedge 42 pulled forwardly in the recesses 48, there is sufficient space between the recess surfaces 90*a* and 90*b* and the wedge surfaces 45*a* and 45*b* to allow the upper and lower wedge portions 44*a* and 44*b* to shift away from each other.

Another alternative to casting in a biasing force when manufacturing the wedge is to provide an O-ring or other spring-loaded device to urge spaced jaws formed by the upper and lower portions towards one another to grip the cable. Manifestly, other shapes and constructions of locking wedge devices which could be employed with the cable deflection device, which receives the large loading and transfers the same through the pulley member and the attaching bolt which is anchored to the vehicle seat or the vehicle floor. As stated earlier, the metal body for the cable deflection device 15 may be a metal casting rather than the illustrated sheet metal body. Either a casting body or the sheet metal body may be used for the cable deflection device 15. The cast body can be of substantially the same configuration as the illustrated folded body.

To change the direction of the cable travel within the folded metal deflection device, there is provided the curved surface 50 on the pulley-shaped insert 52 which is non-rotatably mounted in the recesses 54 in the side walls 34*a* and 34*b* (FIG. 6) of the deflection device. The illustrated non-rotatable pulley insert is formed with the curved surface 50 extending for over 270°. To prevent rotation of the insert about a bolt 90 inserted into the bore in the insert, there is a radially outwardly extending projection 90 which is inserted into rectangular recesses 54*a* in the respective side walls. The size and shape of the recess 54*a* in the side walls is made to cooperate with and to hold the projection against turning and to locate the insert in the deflection device with the curved surface 50 for engagement with the cable. Herein, the insert 52 is provided with an enlarged outer diameter flange 92 as best seen in FIG. 2 which is to be abutted against the outer surface or exterior surface of the wall 34*b* of the folded metal body 35.

As can be understood from FIGS. 2, 5 and 6, the cable 14 when curved about the surface 50 of the pulley-like insert is positioned in channel 99 (FIG. 4) defined by curved flanges 95 and 96 and the surface 50 of the insert. The flanges 95 and 96 are bent over from the side wall 34*a* toward the side wall 34*b* to bridge the space between the side walls so that the cable is confined between the curved surface 50 and inner curved surfaces 95*a* and 96*a* between side walls 34*a* and 34*b* in its travel and its change of direction.

As previously explained, the pulley-shaped insert 52 is provided with a central bore 52*a* to receive a locking bolt which is secured to the vehicle anchorage thereby connecting the pretensioner deflection device. Because the deflection device in turn holds and mounts a simple metal tube cylinder, there is provided a very simple and slim construction for the securement and positioning of the pretensioner in the narrow packaging space available in most vehicles.

From the foregoing, it will be seen that there has been provided a small and low cost pretensioner that uses for gas generation a small, inexpensive cylinder formed of a sheet metal tube or sleeve which has one end bent and the other end open and through the open end are inserted the components of the integrated piston gas generator which provides a relatively simple way of generating the gas for pulling the cable more tightly about the vehicle occupant. The low cost locking device is preferably achieved by having the locking device mounted directly on the cable deflection device so that when the locking device locks the cable against travel in the rebound direction, the forces from the taut cable are applied directly to the vehicle without having to be transferred into and through the cylinder as in the prior art devices where the piston is locked by a locking device cooperating with the piston and the cylinder wall. The preferred and illustrated locking device is a one-piece member of simple construction rather than having a member of separate springs or separate pieces which have to be assembled and each of which adds additional cost.

Having provided the disclosure of the illustrated embodiment, one skilled in the art may devise other embodiments and modifications which fall within the scope and sphere of the appended claims. In these further embodiments or modifications are deemed to be further embodiments of the present invention. The scope of the present invention is defined by the following claims.

What is claimed is:

1. A belt pretensioner for a vehicle occupant restraint system comprising:
    a cylinder having an elongate axis;
    a piston having a first end and a second end mounted in the cylinder for travel therein;
    a recess in the first end of the piston;
    an electrically ignitable charge in the recess of the piston;
    an igniter in the recess of the piston for igniting the ignitable charge;
    a cable connected to the second end of the piston so that the cable is pulled in the direction of piston travel when the charge is ignited; and
    axial gas discharge ducts in the piston that are oriented to extend axially substantially parallel to the cylinder elongate axis for directing gas axially from the recess into the cylinder to drive the piston,
    wherein the piston has a hollow, large diameter portion slightly smaller than the cylinder for sliding therein and in which the charge is held, and the piston has a small diameter portion, and a transition wall between the large and small diameter portions in which the axial gas discharge ducts are formed so that gas is discharged axially into the cylinder from the piston larger diameter portion through the axial ducts and about the piston smaller diameter portion.

2. A belt pretensioner in accordance with claim 1 wherein the ignitable charge comprises a bag and an ignitable powder in the bag.

3. A belt pretensioner in accordance with claim 1 comprising:
    a cable deflection device for deflecting the direction of cable travel; and
    the cylinder being mounted on the cable deflection device.

4. A belt pretensioner for a vehicle occupant restraint system comprising:
    a cylinder unit having a piston mounted in the cylinder;
    an ignitable charge associated with the cylinder unit to drive the piston in a belt tightening direction;
    a connecting cable connected at one end to the piston;
    a deflection device having a folded sheet metal body for deflecting the cable and having the cylinder unit mounted thereon;
    a pair of wall portions of the deflection device which are integral with each other;
    a fixed wedge-shaped opening formed in each wall portion of the folded sheet metal body; and
    a locking wedge that is received in the wedge-shaped openings and is mounted on the cable for limiting pull back of the piston in a direction opposite to the belt tightening direction due to rebound movement of the passenger and the exertion of a tension force on the cable.

5. A belt pretensioner in accordance with claim 4 wherein the locking wedge comprises:
    a wedge in the deflection device that is cammed to more tightly grip the cable with a pulling of the cable in the opposite direction.

6. A belt pretensioner in accordance with claim 5 wherein the wedge comprises a one-piece wedge that includes:
    a first wedge portion of the one-piece wedge on one side of the cable;
    a second wedge portion of the one-piece wedge on an opposite side of the cable; and
    an integral intermediate portion integral with and joining together the first and second wedge portions.

7. A belt pretensioner in accordance with claim 4 wherein the locking wedge comprises:
    a one-piece wedge mounted in the wedge-shaped openings of the sheet metal body.

8. A belt pretensioner in accordance with claim 7 wherein the one-piece wedge comprises:
    an upper wedge portion;
    a lower wedge portion; and
    a pair of thin, curved ribs which join the upper wedge portion and the lower wedge portion.

9. A belt tensioner in accordance with claim 4 wherein the deflection device includes an arcuate portion of the folded sheet metal body that is integral with the pair of wall portions and has a curvature substantially matching the cylinder for clamping the arcuate portion about the cylinder.

* * * * *